United States Patent [19]

Lippert et al.

[11] 3,960,732
[45] June 1, 1976

[54] SYSTEM FOR DEWATERING DILUTE SLURRIES

[75] Inventors: Thomas E. Lippert, Monroeville; Michael C. Skriba, Pittsburgh, both of Pa.

[73] Assignee: The United States of America as represented by the Administrator of the Environmental Protection Agency, Washington, D.C.

[22] Filed: Nov. 1, 1974

[21] Appl. No.: 520,218

[52] U.S. Cl. .............................. 210/386; 100/152; 209/254; 209/272; 210/77; 210/401; 210/405; 210/456
[51] Int. Cl.² ................... B01D 33/36; B01D 33/38
[58] Field of Search ............... 29/132; 100/118, 151, 100/152, 153, 154; 209/254, 272, 307, 308, 428, 429, 430, 498, 499, 405; 210/77, 386, 400, 401, 419, 456

[56] References Cited
UNITED STATES PATENTS

| 2,209,759 | 7/1940 | Berry | 100/153 X |
|---|---|---|---|
| 2,312,764 | 3/1943 | Lubke | 210/456 X |
| 3,222,209 | 12/1965 | Brundige et al. | 29/132 X |
| 3,365,774 | 1/1968 | Kusters | 29/132 |
| 3,459,122 | 8/1969 | Pastoors et al. | 210/400 X |
| 3,617,445 | 11/1971 | Brafford | 29/132 X |
| 3,666,095 | 5/1972 | Krynock et al. | 209/254 |
| 3,703,963 | 11/1972 | Eguchi et al. | 210/386 |
| 3,741,388 | 6/1973 | Takahashi | 210/386 X |
| 3,772,144 | 11/1973 | Luthi et al. | 210/386 X |
| 3,774,760 | 11/1973 | Beristain et al. | 210/386 X |
| 3,796,317 | 3/1974 | Lippert et al. | 210/386 |

FOREIGN PATENTS OR APPLICATIONS

| 1,146,383 | 11/1957 | France | 210/400 |

*Primary Examiner*—Charles N. Hart
*Assistant Examiner*—Robert G. Mukai

[57] ABSTRACT

An improved system for dewatering dilute slurries is disclosed. The system includes a spring-loaded sludge feed tray incorporating an adjustable flow splitter plug, along with spring-loaded sludge side guides. The sludge-cake compression section provides for a compression roller which is adjustable between two positions as a component in the backflushing of the sludge carrier screen using cake effluent. Also, a particular screen sludge solids loading range is employed which results in a significant improvement in performance and capacity of the dewatering system.

10 Claims, 7 Drawing Figures

SYSTEM FOR DEWATERING DILUTE SLURRIES

BACKGROUND AND SUMMARY OF THE INVENTION

Previous systems for extracting liquid from dilute slurries, such as waste activated sewage sludge, include systems of the type described in U.S. Pat. No. 3,796,317 to Lippert et al. In this prior art dewatering system, a pair of concentrically mounted endless belts, one belt formed of a screen-like material and the other porous capillary belt, are employed as part of a system which combines the action of capillary force with mechanical compression to extract the desired amount of liquid.

By the present invention, there is provided a dewatering system which has improved features over systems such as that described in U.S. Pat. No. 3,796,317. The particular features of the present invention include a spring-loaded or balanced sludge feed tray incorporating an adjustable flow splitter plug, along with spring-loaded sludge side guides. A sludge cake compression section design allowing two-position adjustment of the compression roller is employed as a component in the backflushing of the sludge carrier screen using cake effluent. Also, a particular solids loading is employed which results in a significant improvement in performance of the dewatering system.

BRIEF DESCRIPTION OF THE DRAWINGS

The advantages and features of the dewatering system of the present invention will be more clearly understood from the following description of the preferred embodiments, taken in conjunction with the accompanying drawings, wherein.

DESCRIPTION OF THE PREFERRED EMBODIMENTS

Figure 1:
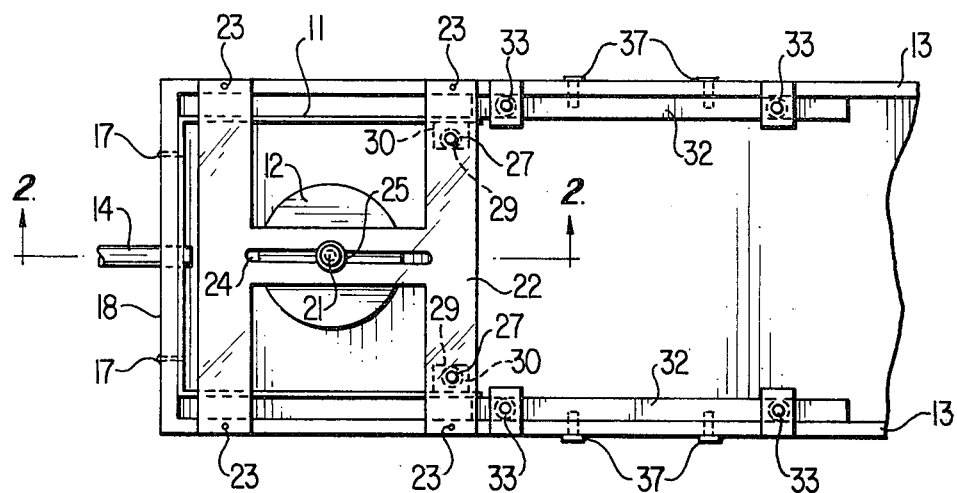
FIG. 1 is a plan view of the feed tray apparatus of the present invention.
Figure 2:
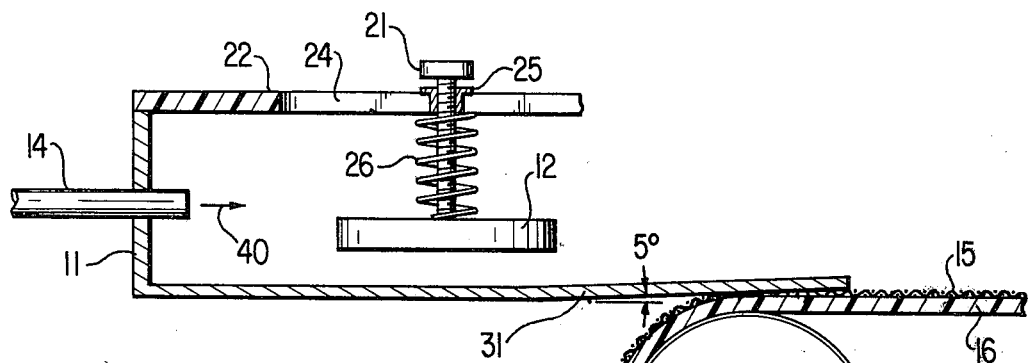
FIG. 2 is a side elevation in cross section, taken along line 2—2 of FIG. 1, showing the relationship of the feed tray with the screen and porous belt, the view being on an enlarged scale.
Figure 2:
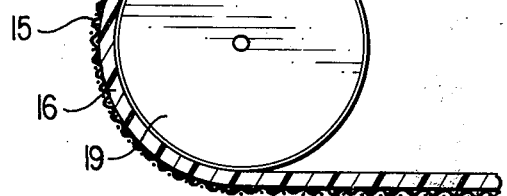

In the embodiment of the present invention as shown in FIGS. 1 through 5, there is provided an apparatus for use in dewatering waste activated sludge or other dilute slurry. The apparatus includes a shallow feed tray 11, as shown in FIGS. 1 and 2, incorporating a flow splitter plut 12. The feed tray 11 may be installed upon dewatering apparatus such as that described in U.S. Pat. No. 3,796,317 and will include means for mounting the tray 11 within walls 13 arranged along the sides adjacent to and above an endless screen 15 and porous belt 16. As shown in FIG. 1, the tray 11 is secured by bolts 17 to a rigid metal cross-member 18 which in turn is welded or otherwise attached to the side walls 13. The screen 15 and porous belt 16 are mounted on an idler roller 19 which operates in conjunction with drive rollers 42 and 43 at the opposite end of the system (FIG. 5) for rotation of the screen 15 and belt 16. The shallow tray 11 is designed to accommodate a sufficient flow velocity of sludge 40 from feed pipe 14 in order to prevent solids from settling to the bottom of the tray 11. Solids lying on the bottom of the tray 11 would interrupt the uniform flow of the sludge 40 onto the screen 15 and porous capillary belt 16. The flow splitter plug 12 spreads the sludge 40 in a laminar flow manner across the width of the tray 11.

In accordance with the present invention, it has been found that it is necessary to maintain an even sludge feed over the width of the capillary belt to achieve efficient capillary dewatering. The problem is compounded when the sludge layer flowing onto the belt is required to be thin, approximately 1/32 inch, for example.

The position of the splitter plug 12 is adjustable so that changes can be accommodated in sludge flow rate or type of sludge without changing the tray feed arrangement. Such adjustment is provided by an adjustment knob 21 which is mounted in bracket 22. As shown in FIGS. 1 and 2, the bracket 22 is formed as an H-shaped member, with each of the four legs being attached by a bolt 23 to a respective side wall 13 of the dewatering apparatus. A slot 24 is provided in the central portion of the bracket 22 to allow the position of the splitter plug 12 to be varied along the length of the tray 11 by adjusting the knob 21. The adjustment knob 21 is spring-loaded by spring 26 and mounted so as to provide adjustment of the height of the flow splitter plug 12 within the interior of the tray 11. For this purpose, the shank of the adjustment knob 21 has a threaded surface which engages a threaded lock nut 25 which rests within the slot 24.

The splitter plug 12 is preferably formed so that its horizontal cross-section is circular, the rounded sides of the plug 12 assisting in providing a smooth flow of sludge within the tray 11. The splitter plug 12 also serves to dampen surges in the sludge feed flow, particularly those occurring with positive displacement type pumps. At high sludge feed rates, the plug 12 is advantageously positioned near the rear of the tray in order to streamline the sludge flow pattern, while at low sludge flow rates, it has been found preferable to position the plug 12 closer to the exit end of the tray 11. The size of the splitter plug 12 is preferably such that the ratio of tray 11 width to diameter of the plug 12 is about 3 to 4:1, such dimensions having been found to materially enhance the laminar flow characteristics of the sludge feeding onto the screen 15, thus resulting in improved dewatering of the sludge which is uniformly distributed across the surface of the screen 15.

Figure 3:
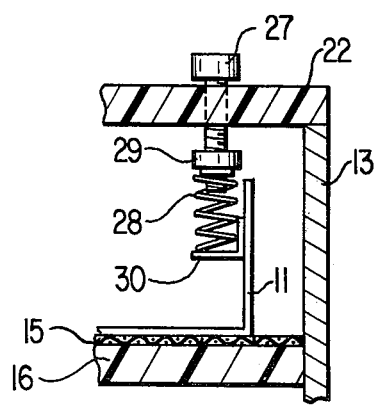
FIG. 3 is an end view of a portion of the feed tray apparatus of the present invention, partially in cross-section.

The feed tray arrangement includes an additional feature which provides for spring-loading the tray edges where the sludge exits from the tray 11, by means of spring-loaded mechanisms 27. As shown in FIGS. 1 and 3, two such mechanisms 27 are provided, one on either side of the tray 11, the mechanisms 27 being threadedly received by the bracket 22. A spring 28 is attached to an adjusting member 29 which is threadedly carried by the shank of the mechanism 27. An L-shaped brace 30 is welded to the inner wall of the tray 11 to provide a seat for the lower portion of the spring 28. Thus, manual rotation of the adjusting member 29 will vary the downward pressure on the brace 30 and tray 11. A primary purpose of the spring-loaded mechanism 27 is to provide a downward pressure on the edges of the tray 11 to ensure intimate contact of the tray 11 with the screen 15 and belt 16 arrangement. In this way, sludge is prevented from flowing back under the tray 11. Furthermore, the downward pressure of the mechanisms 27 results in intimate contact being maintained between the screen 15 and porous belt 16 at the moment when sludge is being applied. Such contact between the screen 15 and belt 16 is vital in order to achieve rapid and proper dewatering of the sludge. The edge of the tray 11 over which the sludge flows is feathered to reduce the surface tension force at this point. The bottom surface 31 of the mouth of the tray 11 which the sludge exits onto the screen 15 is tilted slightly upward at an angle of about five degrees to eliminate forward momentum of the flow caused by the force of gravity.

Figure 4:
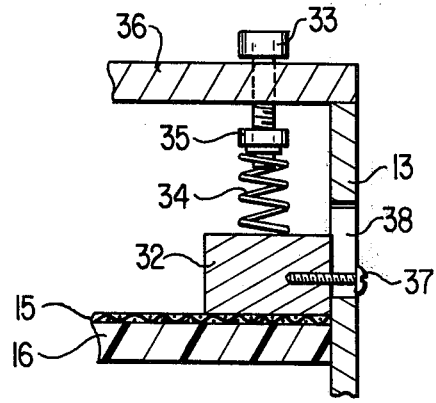
FIG. 4 is an end view of the side guide configuration of the present invention, partially in cross-section.

In operation of a dewatering system such as that employed in the present invention, it is important that the sludge once introduced onto the screen belt 15 must not spill over the sides. This is ensured by utilizing side sludge guides 32 as illustrated in FIGS. 1 and 4. The guides 32 are constructed from a low friction material such as plexiglass since a sliding seal must be maintained. The guides 32 are held against the screen 15 and porous 16 belts using a spring-loaded tensioning device 33 at each end of the guide 32 on each side of the belts. The devices 33 have the same general construction as the mechanisms 27 employed with the tray edges, being provided with a spring 34 secured to an adjusting member 35 which is threadedly secured on the shank of the device for rotation in order to vary the tension on the guide 32. Each device 33 is threadedly received by a horizontal bracket 36 which is welded or otherwise attached to the top of the wall 13. Bolts 37 are secured to the sides of the guides 32 at suitable intervals, each bolt 37 having freedom for vertical movement within a slot 38 in the wall 13. The main purpose of these tensioned side guides 32 is to prevent sludge from spilling down between the belts 15, 16 and the side walls 13 of the apparatus. The guides 32 extend from a point behind the edges of the tray 11 for a distance of about 2 to 3 feet along the length of the walls 13. This arrangement also allows freedom for the belts 15 and 16 to move in the vertical direction, as is the tendency in such endless belt systems. Should this vertical movement be suppressed, the screen belt 15 would not track properly and would likely tear. Thus, the tensioned side guide arrangement improves system operation.

Figure 5:
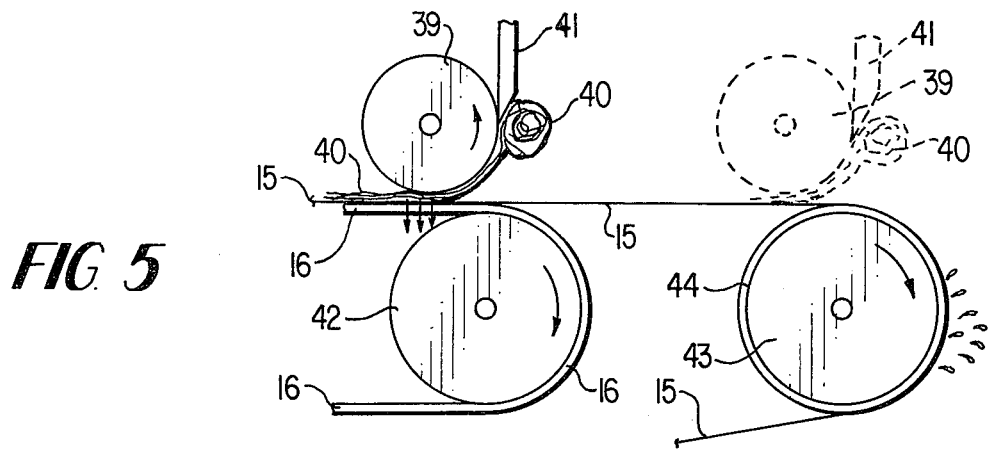
FIG. 5 is a schematic representation of apparatus which provides a screen backwash system for the dewatering apparatus of the present invention.

In the mechanical compression of the sludge cake, a spring-loaded steel roller 39 is employed, as shown in FIG. 5, with the roller 39 riding over a sludge cake 40. As the sludge cake 40 is compressed, filtrate water is absorbed through the screen belt 15 into the porous capillary belt 16. This roller 39 also provides a mechanism 41 for sludge cake detachment, in accordance with the conventional practice. An improvement in the operation and manufacturing costs of the roller 39 have been realized through the use of epoxy-coated carbon steel rollers. Since the sewage environment is generally corrosive, treatment of the carbon steel is required. It has been found that an epoxy coating that provides a smooth surface finish can be utilized in the roller device 39 without degrading the sludge cake detachment. A particular epoxy coating which has been employed with good results is a polyamide catalyzed thermosetting epoxy resin, such as that manufactured by E.I. du Pont de Nemours and Company under the trademark Corlar.

The compression roller 39 is employed in conjunction with drive rollers 42 and 43 with the capillary belt 16 passing around roller 42 and the screen belt 15 passing around roller 43, in accordance with conventional practice such as that described in U.S. Pat. No. 3,796,317, the belts 15 and 16 being also mounted concentrically on the idler roller 19 at the opposite end of the system. Slight relative linear motion may be provided between the screen belt 15 and porous belt 16 by suitable adjustment of the speed of the drive motors for drive rollers 42 and 43. It has been found, in accordance with the present invention, that distinct advantages are obtained by providing for the compression roller 39 to be adjustable between dual positions, as shown in FIG. 5. The first position above roller 42 provides for compressing the sludge cake 40 over over the porous dewatering belt 16. As the sludge cake is removed by mechanism 41 from the roller 39, the cake falls back onto the screen 15 and is carried by the screen 15 over the roller 43 where the cake falls into suitable sludge discharge equipment (not shown).

In the second or alternate position of the roller 39, shown in dashed lines, the porous dewatering belt 16 and screen belt 15 carrying the sludge cake 40 have been separated, and the sludge cake 40 is initially compressed by the roller 39 as the screen belt 14 is tracked over drive roller 43. In this alternative arrangement, the sludge cake 40 is detached from the roller 39 above the drive roller 43 and is carried by the screen 15 over the roller 43 into the sludge discharge equipment. The compression roller 39 can be mounted for movement between the two positions by any suitable means, such as a bracket and belt arrangement (not shown) attached to the frame for the dewatering system. This capability for positioning the compression roller 39 in either of two positions provides machine flexibility which is highly advantageous in adapting to various sludge characteristics.

Drive rollers 43 is preferably covered with an open cell foam material to provide resiliency to the compression force of the roller 39 and also to absorb the residual water that the compression roller 39 squeezes from the sludge cake 40. This water can then be used to backwash the screen belt 15. As the screen belt 15 tracks around the drive roller 43, the increasing tension force on the screen 15 squeezes the absorbed water out of the foam 44 and back through the screen belt 15, thereby, in effect, backwashing the screen 15 as illustrated in FIG. 5. This reduces any external wash water requirements.

Figure 6:
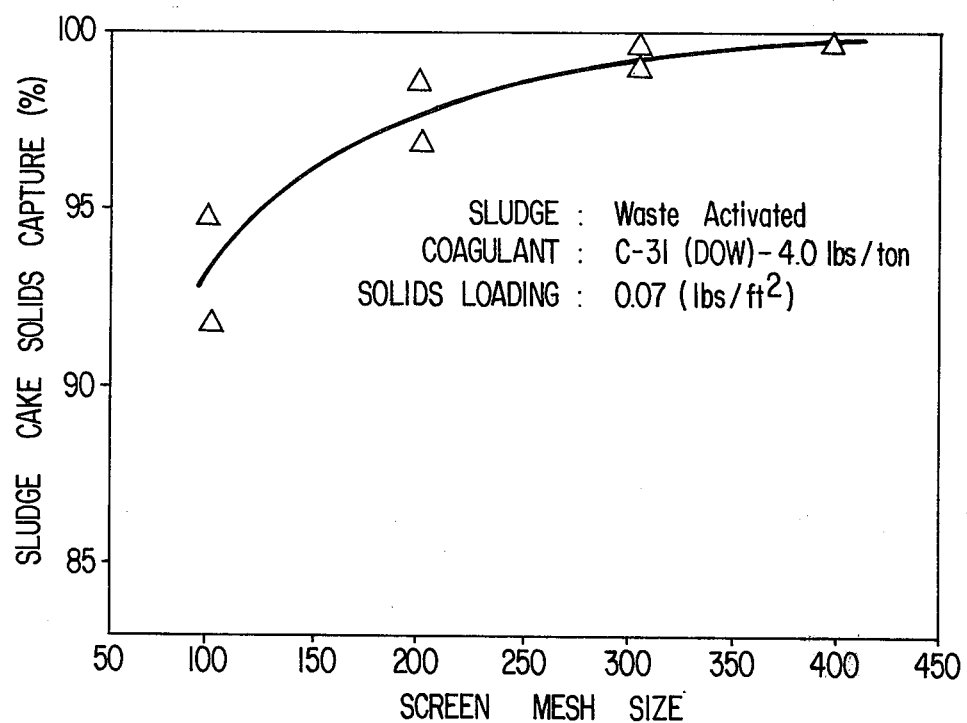
FIG. 6 is a graph showing the relationship between screen mesh size and sludge cake solids capture.

Furthermore, concerning the screen 15, it has been found that, by using screens of different mesh sizes, the sludge cake solids capture can be controlled and coagulant demand somewhat regulated. This adds an additional parameter in the control of overall system performance. FIG. 6 is provided to illustrate the way in which screen mesh size has been found to affect sludge cake solids capture.

An additional aspect of the present invention is concerned with solids loading and sludge-belt contact time. Extracting liquid from dilute slurries such as waste activated sewage sludge is an expensive and generally inefficient operation as carried out with previously known vacuum and centrifugal methods. Such prior methods of concentrating dilute slurries often employ more than one system or mechanical device. For example, both a digestor and vacuum drum filter may be required to dewater an activated sludge from 1% to 20% solids. Also, previous dewatering devices must be capable of handling large quantities of water over relatively small surface areas. A typical solids yield or capacity of these devices operating with a dilute slurry is approximately 2.0 lbs dry solids/hr ft$^2$. Increasing solids yield is, of course, desirable in order to improve system performance and economy of operation.

In accordance with the present invention, the yield of a capillary dewatering device can be significantly enhanced. The present method represents a novel mode of system operation. According to present practice as heretofore known, the operating conditions of a capillary dewatering device with a 2% slurry are such that the sludge-belt contact time is approximately 30 to 60 seconds at a solids loading of approximately 0.010 to 0.020 lbs/ft$^2$. This results in a solids yield of about 2.0 lbs/hr ft$^2$. Under these conditions, several operating problems are encountered. To increase yield by increasing solids loading requires larger quantities of water per given area of belt, and such additional water must be transferred and carried in the capillary belt. However, as the belt becomes saturated, the capillary action is slowed and eventually ceases. In addition, with increased solids loadings, the sludge cake thickness at the end of the capillary section is such that it will not pass under the compression roller in an efficient manner. Sludge accumulates in front of the roller and escapes around the edges of the compression roller. This significantly degrades system performance.

Figure 7:
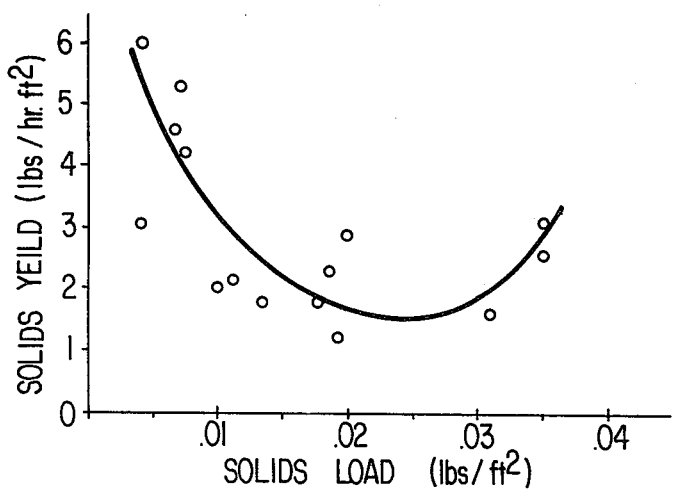
FIG. 7 is a graph showing the relationship between solids loading and solids yield.

To obtain significantly higher solids yields, a radically different set of system operating conditions is proposed. In accordance with the present invention, higher yields are obtained by actually decreasing the solids loading (lbs/ft$^2$). This decrease in loading allows for a proportionally larger decrease in the sludge-belt contact time to effect dewatering. Specifically, the design and operation of the capillary dewatering device should be based on a solids loading in the range of 0.001 to 0.007 (lbs dry solids)/ft$^2$ and a sludge-belt contact time of about 4 seconds. This procedure gives a solids yield of about 4.5 lbs/hr ft$^2$. An approximate curve showing the relationship obtained between solids loadings and yield is shown in FIG. 7. This particular curve is for a 2% waste activated sludge concentrated by capillary action to 8% solids.

It is through that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

It is claimed:

1. An apparatus for dewatering a dilute slurry, including a base support having side walls and opposite ends, at least one endless belt mounted in the base support for movement longitudinally thereof and with which the slurry makes contact for removal of water, a feed tray having side walls, a bottom wall and a mouth end, means fixing the feed tray to one end of the base support at a location within the base support so that the mouth end of the tray extends at least partially over the endless belt whereby the slurry received by the feed tray is fed into the endless belt, a flow splitter means for spreading the slurry across the width of the tray, supporting means secured to the side walls of the base support, means mounting the flow splitter means on the supporting means for adjustment longitudinally of the tray and toward and away from the bottom wall of the tray, respectively, to accommodate varying flow rates or types of slurry, and the flow splitter means being constituted by a disclike body having a substantially planar lower surface arranged in parallelism to the bottom wall of the tray.

2. The apparatus of claim 1 further including adjustable means for maintaining a downward pressure on the side walls of the feed tray adjacent the mouth end, said adjustable means being carried by the supporting means thereof to ensure intimate contact of the tray with said endless belt to prevent slurry from flowing back under the tray.

3. The apparatus of claim 1 wherein the ratio of the tray width to the diameter of teh disc-like body is about 3 to 4:1 thereby enhancing the laminar flow characteristics of the slurry feeding onto the endless belt and an improved dewatering of the slurry which is uniformly distributed across the belt.

4. The apparatus of claim 1 wherein the bottom wall of the tray adjacent the mouth end thereof is tilted upwardly at an angle of about five degrees above the horizontal to eliminate forward momentum of the flow caused by the force of gravity.

5. The apparatus of claim 1 further including a spring-loaded feed side guide on each side of said endless belt adjacent to and downstream of said feed tray for preventing spillage of the slurry over the sides, each of said side guides being of a low friction material and a spring-loaded tensioning device at each end of each guide and mounted on said supporting means to hold each guide against the belt.

6. An apparatus for dewatering a dilute slurry, including a supporting base having opposite ends, an endless screen belt and an endless porous capillary belt, said belts being mounted in said supporting base for linear movement and being concentrically disposed with respect to each other so that the screen belt rides on top of the capillary belt, an idler roller adjacent one end of the supporting base on which said belts are mounted, separate axially spaced drive rollers adjacent the other end of the supporting base on which each belt is respectively mounted, and the drive roller for the screen belt being located outwardly of the drive roller for the capillary belt, a compression roller for compressing the slurry as it moves on said belt, and means for adjusting the compression roller longitudinally between two positions, so that the compression roller is adjustable between a first compression position above and cooperable with the drive roller for the capillary belt and a second compressing position above and cooperable with the drive roller for the screen belt.

7. The apparatus of claim 6 wherein the slurry-contacting surface of the drive roller for the screen belt is provided with a covering of water-absorbing foam material.

8. The apparatus of claim 6 wherein means is provided for producing relative linear motion between the screen belt and porous belt.

9. The apparatus of claim 6, in which the compression roller is provided with an epoxy-coated carbon steel surface.

10. The apparatus of claim 9, wherein the material for providing the epoxy-coated surface is a polyamide catalyzed thermosetting epoxy resin.

* * * * *